Jan. 17, 1961
J. E. CARTER
2,968,225
SHAPER
Filed Aug. 1, 1957
2 Sheets-Sheet 1
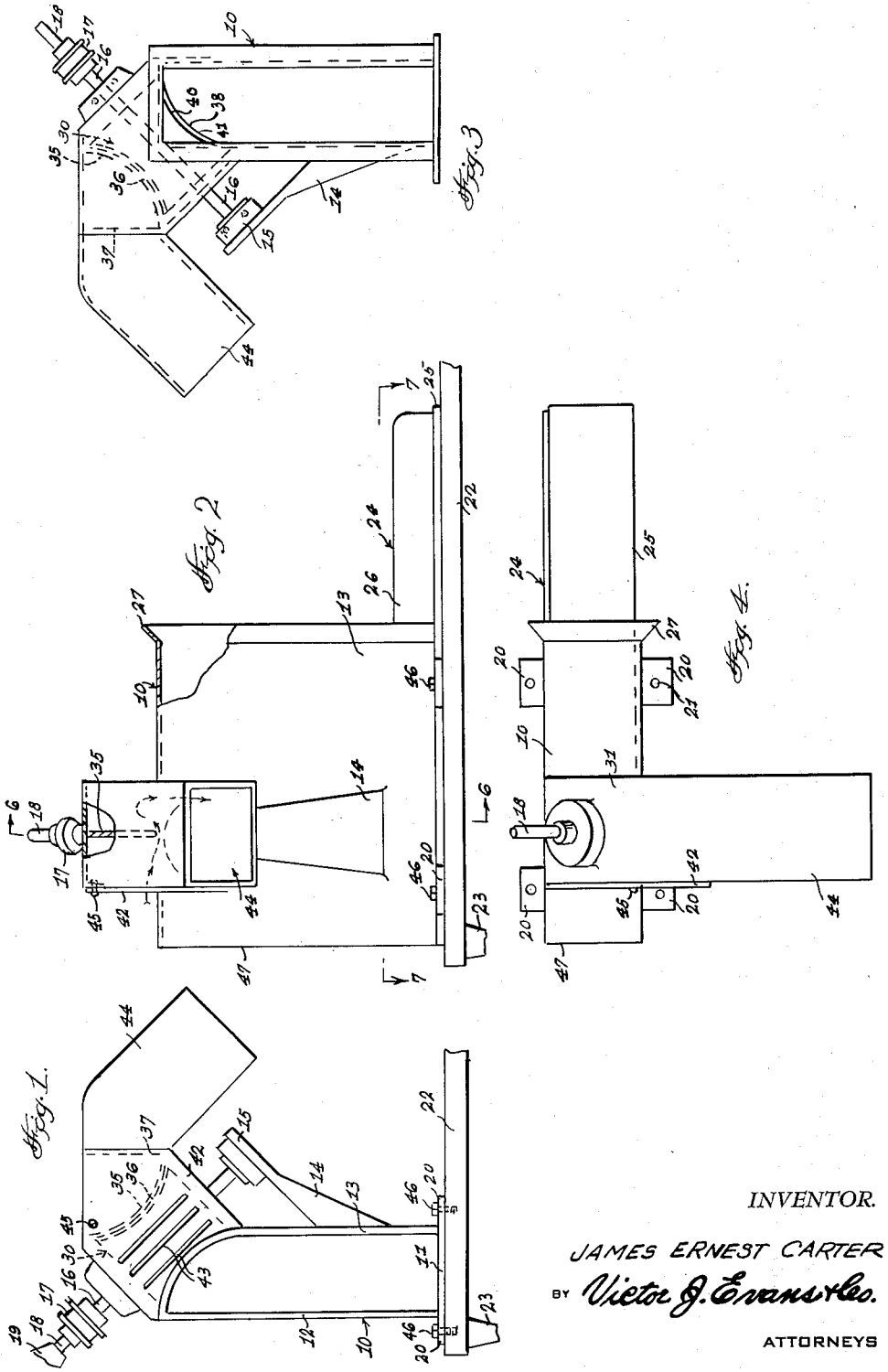
INVENTOR.
JAMES ERNEST CARTER
BY *Victor J. Evans & Co.*
ATTORNEYS Jan. 17, 1961 J. E. CARTER 2,968,225
SHAPER
Filed Aug. 1, 1957 2 Sheets-Sheet 2
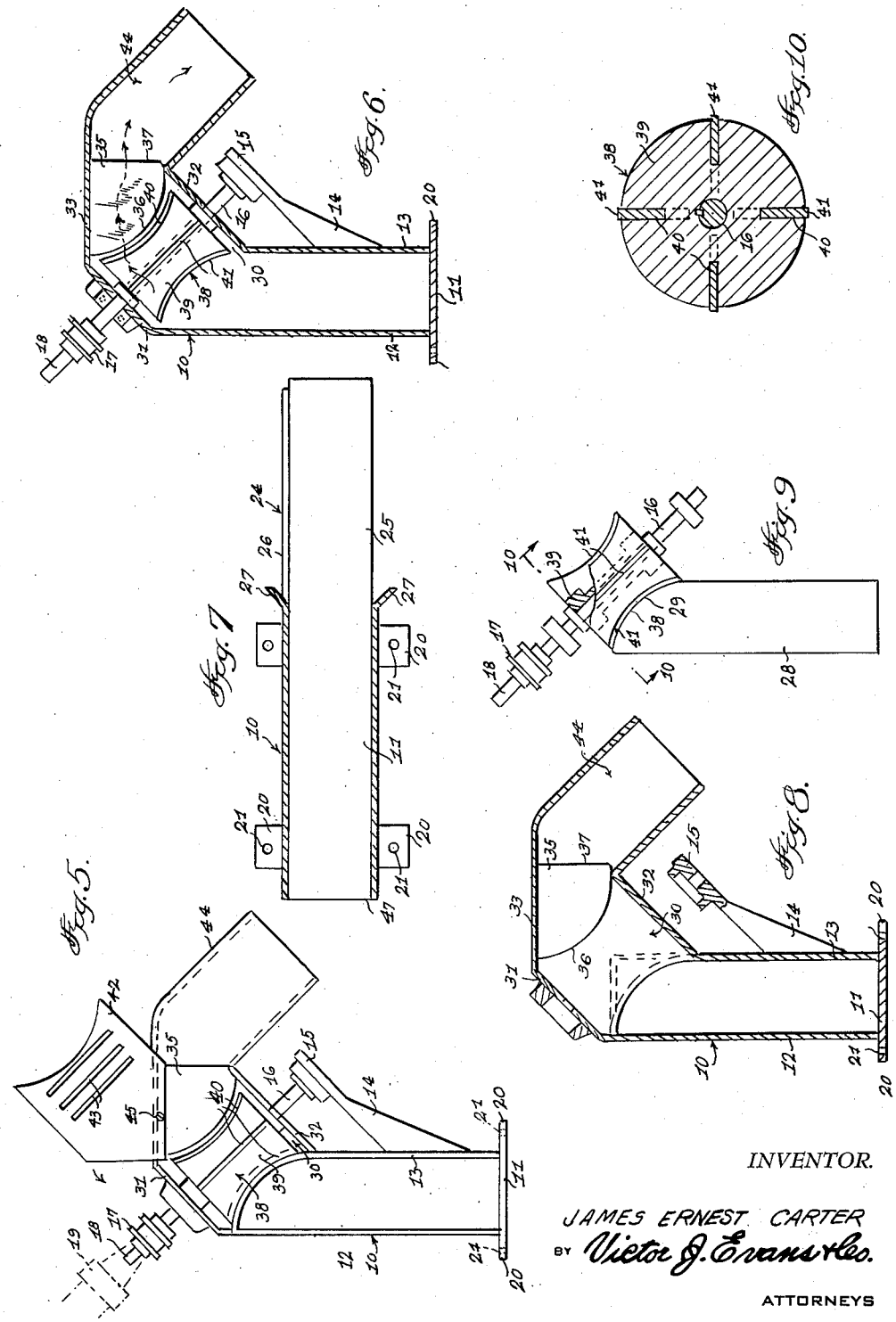
INVENTOR.
JAMES ERNEST CARTER
BY *Victor J. Evans & Co.*
ATTORNEYS

United States Patent Office 2,968,225
Patented Jan. 17, 1961

2,968,225

SHAPER

James Ernest Carter, % R. P. Langford, 610 Bassett Tower, El Paso, Tex., assignor of one-fourth to Richard P. Langford, El Paso, Tex.

Filed Aug. 1, 1957, Ser. No. 675,651

1 Claim. (Cl. 90—18)

This invention relates to a shaping or cutting tool or apparatus.

The object of the invention is to provide a shaping apparatus which is adapted to be used for making or providing rounded corners or edges on various types of work pieces.

Another object of the invention is to provide a shaping mechanism which includes a rotary cutter that is provided with a plurality of blades, and wherein the cutter is adapted to be actuated by a suitable power source, so that as work is fed into the apparatus, the cutter will provide on the work a rounded corner or edges so that the work can be shaped to the desired contour or configuration.

A further object of the invention is to provide a shaping apparatus which is extremely simple and inexpensive to manufacture.

Other objects and advantages will be apparent during the course of the following description.

In the accompanying drawings, forming a part of this application, and in which like numerals are used to designate like parts throughout the same.

Figure 1 is a rear elevational view illustrating the shaper of the present invention.

Figure 2 is a side elevational view of the shaper of the present invention.

Figure 3 is a view showing the front end of the device.

Figure 4 is a plan view of the shaping apparatus of the present invention.

Figure 5 is a view similar to Figure 1, but showing the louvered plate in raised position.

Figure 6 is a sectional view taken on the line 6—6 of Figure 2.

Figure 7 is a sectional view taken on the line 7—7 of Figure 2.

Figure 8 is a view similar to Figure 6 but showing the drive shaft and cutter removed.

Figure 9 is a fragmentary sectional view illustrating the action of the cutter in forming the rounded corner or edge on the work piece.

Figure 10 is a sectional view taken on the line 10—10 of Figure 9 and illustrating the cutter.

Referring in detail to the drawings, the numeral 10 indicates a hollow housing and includes a horizontally disposed bottom wall 11, and vertically disposed side walls 12 and 13. Extending upwardly and outwardly from the side wall 13 and secured thereto is a bracket 14, and the bracket 14 supports a bearing 15. A drive shaft 16 has an end thereof arranged in engagement with the bearing 15, and a coupling 17 serves to connect the shaft 16 to a shaft extension 18. The shaft extension 18 may be driven by any suitable power source, as for example, as shown in Figure 5, the shaft extension 18 may be actuated or driven by a drill motor 19.

Extending outwardly from the lower end of the housing 10 and secured thereto or formed integral therewith is a plurality of lugs 20 which are provided with openings 21 whereby suitable securing elements such as bolts or screws can be extended through these openings 21 and into engagement with a supporting table 22, and the supporting table or bench 22 may include the usual legs 23, Figure 2.

The entrance end of the device is provided with a guide apron which is indicated generally by the numeral 24, and the apron 24 includes a horizontally disposed portion 25 and a vertically disposed portion 26. The work 28 which is adapted to be shaped or cut, is adapted to be fed along or moved along the apron 24 and the housing 10 includes a flaring entrance end 27 so as to facilitate the insertion or guiding of the work 28 into the interior of the housing 10. By means of the shaping apparatus of the present invention, the work 28 is adapted to be provided with a rounded corner or edge as indicated by the numeral 29, in Figure 9, whereby the work piece 28 can be used for any desired purpose.

Extending outwardly and upwardly from the top of the housing 10 is a compartment 30 for a purpose to be later described, and the compartment 30 is partially defined by spaced parallel wall members 31 and 32. The wall member 31 terminates in a horizontally disposed wall portion 33, and a baffle or partition 35 depends from the wall portion 33 and is secured thereto in any suitable manner, as for example, by welding. The baffle 35 includes a curved or arcuate surface 36, and a vertically disposed straight edge 37.

Mounted in the compartment 30 is a cutter or shaper which is indicated generally by the numeral 38, and the shaper 38 includes a body member 39 which is mounted on the shaft 16. Carried by the body member 39 is a plurality of cutting blades or shaping blades 40, and the blades 40 each have a rounded or concave cutting surface 41. Thus, as the shaft 16 rotates, the body member 39 will rotate since the body member 39 is connected to the shaft 16, and this rotation of the body member 39 will cause rotation of the cutting blades 40 whereby the work piece 28 which is moving through the housing 10 will be provided with the rounded corner or edge 29.

A plate 42 is connected to the compartment 30, and the plate 42 may be held in place by means of a suitable pin, bolt or the like which is indicated generally by the numeral 45. The plate 42 is provided with a plurality of louvers or slots 43 whereby air can pass through the slots 43. This air is adapted to enter the compartment 30 and pass around the baffle 35 whereby the air will be able to carry away the dust, or other shavings which result from the cutting operation, and these shavings, dust or the like will be discharged out through the duct or chute 44. The rotation of the cutter 38 serves to create a vacuum whereby the air will be drawn or sucked inwardly through the slots 43 so that this air will follow the path indicated by the arrows in Figure 2, for example, so that this air will carry away the various shavings, dust or other foreign matter so that such foreign matter will not interfere with use of the apparatus.

In Figure 1 the numeral 46 indicates suitable securing elements such as bolts which extend through the openings 21 in the lugs 20 whereby the device can be readily secured to the supporting structure 22. The numeral 47 indicates the outlet end of the device through which passes the completed article 28 after it has been provided with the rounded portion 29.

From the foregoing, it is apparent that there has been provided a shaping or cutting apparatus which is especially suitable for use in forming a rounded or curved edge such as the edge 29 on a work piece such as the work piece 28. In use, the work pieces 28 are initially rectangular in cross section so that initially the work pieces 28 do not have the rounded edges 29. The work pieces 28 may be of any suitable material such as a foamlike synthetic plastic or rubber like material, and the rounded or curved edges 29 may be formed thereon for any desired purpose. When the apparatus is being used, the shaft extension 18 may be connected to any suitable power source such as a drill motor 19 or the like. Thus, upon actuation of the motor 19, the shaft extension 18 will rotate, and this in turn will cause rotation of the shaft 16, since the shaft 18 is connected to the shaft 16 through the medium of the coupling 17. The shaft 16 carries the cutter 38, and the cutter 38 is provided with the body member 39 which is keyed to the shaft 16. The body member 39 carries the plurality of cutting blades 40, and the outer surface or edge of each of the blades 40 is shaped arcuately as at 41. Thus, as the cutter 38 rotates, the blades 40 will rotate so as to form the curved edge 29 on the work piece 28. The work pieces 28 are adapted to be moved along the horizontal portion 25 of the apron 24, and these work pieces 28 can be moved manually. The flange or upstanding portion 26 of the apron 24 helps guide the work pieces 28 so that these work pieces 28 can be guided or fed into the inlet or entrance end 27 of the housing 10. The work pieces 28 will thus pass through the housing 10 from the entrance end 27 to the outlet end 47, and as the work pieces 28 pass through the housing 10, the rotating cutter 38 will act on the work pieces so as to form the curved edge 29, so that when the work piece leaves the outlet end 47 it will have been provided with the rounded edge 29.

Furthermore, as previously described, the cutter 38 is positioned in the compartment 30, and arranged adjacent the compartment 30 is the baffle 35 which is provided with the curved lower edge 36. The baffle 35 is secured as by welding to the wall portion 33, and it will be seen that as the cutter 38 rotates, a vacuum will be created whereby air will be sucked in through the slots 43 in the plate 42. This air will follow the direction of the arrows in Figure 2 so that it will move down beneath the edge 36 of the baffle 35 and this air will pass out through the duct or chute 44.

This moving air will serve to carry away any dust, shavings, or other foreign matter so that such particles will not interfere with use of the machine. The plate 42 can be pivoted upwardly from the position shown in Figure 1 to the position shown in Figure 5, as when the parts such as the cutter are to be inspected, replaced, or cleaned. The bearing 15 provides a support for the lower end of the shaft 16 which has the cutter 38 mounted thereon. The air moves in the manner previously described so as to help prevent the waste material from accumulating or the like. The shaper of the present invention can be used for working on various types of material, as for example, it can be used for accurately and quickly shaping semi-soft material such as foam-like materials which have heretofore been cut by hand to specified forms and dimensions for any desired use, such as the manufacture or flotation blocks for parachutes used with anti-aircraft target planes.

The machine is adapted to be driven by a suitable motor such as an electric radial drill motor, or else it can be operated by any suitable power source. The apron 24 and guide portion 27 facilitates the feeding of rectangular shaped stock 28 into the path of the multiple blade cutter 38 so that the material is shaped to the desired form. The stock is fed through the shaper and then the stock is reversed and again passed through the machine to obtain rounded corners on two opposite corners or sides. The cutter serves as a combination cutting tool and blower so as to simultaneously discharge waste material through the chute 44 and this prevents formation of an inferior finished article. The cutting tool 38 is mounted at an angle of approximately 45° with respect to the housing 10 and the cutter 38 is partially encased inside the air exhaust duct. The cutting tool may be supported by ball bearings, and the shaper housing is constructed so that it will conform to the finished surface of the material being worked on or processed. The baffle 35 is arranged to facilitate air control for waste discharge, and the slotted plate 42 permits air to enter as previously described. A flexible coupling 17 will compensate for vibration or for parts which are not properly aligned. The device can be secured to a work bench 22 by means of the securing elements 46 which extend through the lugs 20. The machine of the present invention will process material or stock quickly and accurately so that the finished product will have a high quality.

I claim:

A shaper comprising a hollow housing having an entrance end and an outlet end, said housing including a horizontally disposed bottom wall and vertically disposed side walls, a compartment arranged adjacent the upper end of said housing, said compartment being partially defined by spaced parallel wall members intersecting said housing walls, one of said wall members terminating in the uppermost horizontally disposed compartment wall portion, a bracket extending upwardly and outwardly from said housing and secured thereto, a bearing supported on said bracket, a shaft extending through said compartment and having one end engaging said bearing, a shaft extension coupled to said shaft, said shaft extension adapted to be connected to a power source, a cutter mounted on said shaft, said housing further including a flaring end portion adjacent the entrance end thereof so as to facilitate the insertion or guiding of the work into the interior of the housing; apertured lugs extending outwardly from said housing and adapted to be secured to a supporting structure, a chute extending from said compartment, a baffle arranged adjacent said chute, a plate positioned adjacent said compartment and having a plurality of slots therein for the passage therethrough of air, and a guide apron connected to the entrance end of said housing, said guide apron including a horizontally disposed portion and a vertically disposed portion, the air adapted to enter the compartment and pass around the baffle so that the air will be able to carry away the dust, shavings or the like which result from the cutting operation and whereby these shavings, dust or the like will be discharged out through the chute, the rotation of the cutter serving to create a vacuum whereby the air will be drawn or sucked inwardly through the slots so that such foreign matter will not interfere with the use of the shaper.

References Cited in the file of this patent

UNITED STATES PATENTS

| | | |
|---|---|---|
| 97,551 | Porter | Dec. 7, 1869 |
| 201,822 | Myers | Mar. 26, 1878 |
| 541,376 | Morgan | June 18, 1895 |
| 790,943 | Weber | May 30, 1905 |
| 994,430 | Tunks | June 6, 1911 |
| 1,735,497 | Duty | Nov. 12, 1929 |
| 2,771,104 | Saxe | Nov. 20, 1956 |
| 2,789,593 | Leupold | Apr. 23, 1957 |